US011580459B2

(12) United States Patent
Neelamana

(10) Patent No.: US 11,580,459 B2
(45) Date of Patent: *Feb. 14, 2023

(54) SYSTEMS AND METHODS FOR EXTRACTING SPECIFIC DATA FROM DOCUMENTS USING MACHINE LEARNING

(71) Applicant: Convr Inc., Schaumburg, IL (US)

(72) Inventor: Harish Neelamana, Hoffman Estates, IL (US)

(73) Assignee: Convr Inc., Schaumburg, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/327,736

(22) Filed: May 23, 2021

(65) Prior Publication Data

US 2021/0272024 A1 Sep. 2, 2021

Related U.S. Application Data

(63) Continuation of application No. 16/180,562, filed on Nov. 5, 2018, now Pat. No. 11,049,042.

(51) Int. Cl.
*G06N 20/00* (2019.01)
*G06K 9/62* (2022.01)
(Continued)

(52) U.S. Cl.
CPC ............. *G06N 20/00* (2019.01); *G06F 9/453* (2018.02); *G06F 16/93* (2019.01); *G06K 9/6263* (2013.01); *G06V 30/40* (2022.01)

(58) Field of Classification Search
CPC .......... G06N 20/00; G06N 5/04; G06N 5/022; G06K 9/6263; G06F 9/453; G06F 16/93;
(Continued)

(56) References Cited

U.S. PATENT DOCUMENTS 6,970,858 B1 * 11/2005 Nichols .................... G09B 7/04
706/14
7,089,222 B1 * 8/2006 Lannert .................... G06N 5/04
706/45
(Continued)

FOREIGN PATENT DOCUMENTS

AU 2004254950 A1 * 1/2006 ........... G06F 16/738
CA 2957327 A1 * 6/2009 ........ G06F 17/30011
(Continued)

OTHER PUBLICATIONS https://www.airslate.com/bot/explore/pre-fill-from-opencv-bot (Year: 2020).

*Primary Examiner* — Steven P Sax
(74) *Attorney, Agent, or Firm* — GrowIP Law Group LLC

(57) ABSTRACT

Computer implemented systems and methods are disclosed for extracting specific data using machine learning algorithms. In accordance with some embodiments, a memory device that stores at least a set of computer executable instructions for a machine learning algorithm and a pre-fill engine; and at least one processor that executes the instructions that cause the pre-fill engine to perform functions that include: receiving electronic documents, seed dataset documents, and pre-fill questions; determining output data that enable navigation through the electronic documents using the machine learning algorithm; determining output questions that enable navigation through the electronic documents using the machine learning algorithm; determining output documents to enable navigation through the electronic documents using the machine learning algorithm; and presenting one or more answers for one or more of the output questions using a graphical user interface.

18 Claims, 15 Drawing Sheets

(51) Int. Cl.
*G06F 9/451* (2018.01)
*G06F 16/93* (2019.01)
*G06V 30/40* (2022.01)

(58) Field of Classification Search
CPC .... G06F 16/248; G06F 16/252; G06F 16/332; G06F 40/174; G06F 16/9535; G06V 30/40; G16H 10/60; G06Q 30/0203; G06Q 40/08; G06Q 10/10; G10L 15/22; H04L 51/02
See application file for complete search history.

(56) References Cited

U.S. PATENT DOCUMENTS

| | | | |
|---|---|---|---|
| 7,483,871 B2 | 1/2009 | Herz | |
| 8,442,940 B1 | 5/2013 | Faletti et al. | |
| 9,292,153 B1 | 3/2016 | Edwards et al. | |
| 9,298,780 B1 | 3/2016 | Madhani et al. | |
| 9,483,584 B2 | 11/2016 | Batra | |
| 10,062,039 B1 | 8/2018 | Lockett | |
| 10,212,562 B2 | 2/2019 | Clark et al. | |
| 10,922,473 B1 | 2/2021 | Cogan | |
| 2005/0055306 A1 | 3/2005 | Miller et al. | |
| 2006/0216683 A1 | 9/2006 | Goradia | |
| 2008/0168135 A1 | 7/2008 | Redlich et al. | |
| 2008/0313532 A1 | 12/2008 | Dames et al. | |
| 2009/0012761 A1* | 1/2009 | Bertrand | G06Q 40/08 706/11 |
| 2009/0254572 A1 | 10/2009 | Redlich et al. | |
| 2009/0259975 A1 | 10/2009 | Asai | |
| 2010/0057610 A1 | 3/2010 | Pinkerton | |
| 2010/0306249 A1 | 12/2010 | Hill et al. | |
| 2011/0004588 A1 | 1/2011 | Leitersdorf et al. | |
| 2011/0213655 A1 | 9/2011 | Henkin et al. | |
| 2013/0007587 A1 | 1/2013 | Marantz et al. | |
| 2013/0074063 A1 | 3/2013 | Schwartz et al. | |
| 2013/0268357 A1 | 10/2013 | Heath | |
| 2013/0282430 A1 | 10/2013 | Kannan et al. | |
| 2014/0229204 A1 | 8/2014 | Huynh et al. | |
| 2015/0127659 A1 | 5/2015 | Madhani et al. | |
| 2015/0135300 A1 | 5/2015 | Ford | |
| 2015/0186507 A1 | 7/2015 | Pawar et al. | |
| 2015/0331995 A1 | 11/2015 | Zhao et al. | |
| 2016/0036899 A1 | 2/2016 | Moody et al. | |
| 2016/0147946 A1 | 5/2016 | Reden | |
| 2016/0147954 A1 | 5/2016 | Tari et al. | |
| 2016/0162478 A1 | 6/2016 | Blassin et al. | |
| 2016/0182558 A1* | 6/2016 | Tripp | G06F 21/562 726/25 |
| 2016/0364391 A1 | 12/2016 | Eichenlaub et al. | |
| 2016/0364608 A1 | 12/2016 | Sengupta et al. | |
| 2017/0076221 A1 | 3/2017 | Boinodiris et al. | |
| 2017/0076226 A1 | 3/2017 | Allen et al. | |
| 2017/0124052 A1 | 5/2017 | Campbell et al. | |
| 2017/0140047 A1 | 5/2017 | Bendig et al. | |
| 2017/0161439 A1* | 6/2017 | Raduchel | H04W 12/06 |
| 2017/0242879 A1* | 8/2017 | Hatami-Hanza | G06F 16/22 |
| 2017/0315979 A1 | 11/2017 | Boucher et al. | |
| 2018/0025303 A1* | 1/2018 | Janz | G16H 50/20 705/2 |
| 2018/0046609 A1 | 2/2018 | Agarwal et al. | |
| 2018/0285248 A1* | 10/2018 | Gupta | G06F 11/3684 |
| 2019/0065970 A1* | 2/2019 | Bonutti | G06N 5/045 |
| 2019/0108419 A1* | 4/2019 | Coven | G06F 9/44505 |
| 2019/0180641 A1 | 6/2019 | Donaldson et al. | |
| 2019/0190976 A1 | 6/2019 | Chen et al. | |
| 2019/0303448 A1 | 10/2019 | Colangelo | |
| 2020/0042593 A1 | 2/2020 | Hewitt et al. | |
| 2020/0042642 A1* | 2/2020 | Bakis | G06F 40/35 |
| 2020/0074175 A1 | 3/2020 | Zheng et al. | |
| 2020/0098018 A1 | 3/2020 | Narula | |
| 2020/0104359 A1 | 4/2020 | Patel et al. | |

FOREIGN PATENT DOCUMENTS

| | | | | |
|---|---|---|---|---|
| CA | 2642458 A1 * | 5/2010 | | G06N 3/004 |
| CA | 2933175 A1 * | 12/2010 | | G06Q 30/02 |
| CA | 2816107 A1 * | 5/2012 | | G06F 19/328 |
| CA | 2810541 C * | 2/2019 | | G06F 16/951 |
| CA | 3072045 A1 * | 2/2019 | | A01B 3/02 |
| CN | 109614102 A | 4/2019 | | |
| CN | 107257983 B * | 3/2021 | | G06F 9/461 |
| SG | 10202000787P A * | 3/2020 | | |

\* cited by examiner

DISPLAY 1210

STRUCTURE OUTPUT VIEWER 1220

| Question | Answer |
|---|---|
| Licensed Contractor? | Yes |
| Acquired Permit? | No |
| Inspected before construction? | Yes |
| Inspected after construction? | No |
| Architectural plan? | Yes |

FIG. 12

VALUES VIEWER 1320

| Attributes | Document(s) value | D3 Value |
|---|---|---|
| Year Built | 1985 | 1985 |
| Construction Type | Wood | , |
| Number of Stories | 3 | 3 |
| Roof Type | Flat | Flat |
| Roof Age | - | 4 |
| Pool | 1 | 1 |

DISPLAY 1310

SYSTEMS AND METHODS FOR EXTRACTING SPECIFIC DATA FROM DOCUMENTS USING MACHINE LEARNING

CROSS-REFERENCE TO RELATED APPLICATIONS

This is a continuation application that claims the benefit of the filing date of U.S. Non-Provisional application Ser. No. 16/180,562, filed on Nov. 5, 2018, which is hereby incorporated by reference in its entirety.

BACKGROUND

Reading and extracting structured data from non-standardized documents can be a difficult task. For example, reading through documents used for underwriting business insurance can involve reading a wide variety of documents, including documents related to loss history, credit score, employment history, salary verification, financial statements, building permits, statements of values, insurance application forms, and health inspection documents, among many others. Insurance underwriting entails reviewing these and multiple other documents to determine the risk that a specific liability entails.

Some automated techniques for reading and extracting data from documents exist. However, the available automated techniques for extracting textual data are not designed to analyze and extract specific fields related to the business process. For example, there are terms and concepts that are unique to insurance. Some of these terms or concepts may have different applications or meanings in a non-insurance domain. As a result, the existing automated techniques may not successfully extract insurance-specific data, and/or may incorrectly apply the same information in an insurance domain.

Some current automated techniques for extracting data use supervised machine learning techniques. Supervised machine learning techniques involve humans actively creating seed datasets related to the data to be extracted and monitoring the machine's methods and accuracy. However, actively creating seed datasets involves continuous maintenance and human effort to develop new seed datasets to re-train the machine. This human effort can be expensive, error-prone, and time-consuming and further may result in biased machine learning algorithms.

SUMMARY

In one aspect, a system is provided. A system has a memory device that stores at least a set of computer executable instructions for a machine learning algorithm and a pre-fill engine. A processor causes the pre-fill engine to perform functions including receiving electronic documents, seed dataset documents, and pre-fill questions, where the seed dataset documents comprise a set of documents providing reference for determining output documents by the pre-fill engine, and where the pre-fill questions comprise a set of pre-fill questions to be answered using the pre-fill engine. The functions also include determining output data from the electronic documents and data references that enable navigation through the electronic documents using a machine learning algorithm, where the output data comprise data relevant to a particular field of analysis, and where the data references rely upon terminology, categories, classifications and ontology of the particular field of analysis. Additionally, the functions include determining output questions from the set of pre-fill questions and the data references that enable navigation through the electronic documents using the machine learning algorithm, where the output questions are relevant to the particular field of analysis. The functions further include determining output documents from the seed dataset documents and the data references to enable navigation through the electronic documents using the machine learning algorithm, where the output documents are relevant to the particular field of analysis according to the data references. In addition, the functions include presenting one or more answers for one or more of the output questions using a graphical user interface.

In a second aspect, the disclosure describes a method comprising receiving electronic documents, seed dataset documents, and pre-fill questions, where the electronic documents comprise a set of documents to be processed by a pre-fill engine of a computing device, where the seed dataset documents comprise a set of documents providing reference for determining output documents by the pre-fill engine, and where the pre-fill questions comprise a set of pre-fill questions to be answered using the pre-fill engine. The method also includes determining output data from the electronic documents and data references to enable navigation through the electronic documents using a machine learning algorithm executed by the computing device, where the output data comprise data relevant to a particular field of analysis, and where the data references rely upon terminology, categories, classifications and ontology of the particular field of analysis. In addition, the method includes determining output questions from the set of pre-fill questions and the data references to enable navigation through the electronic documents using the machine learning algorithm, where the output questions are relevant to the particular field of analysis. Furthermore, the method includes determining output documents from the seed dataset documents and the data references to enable navigation through the electronic documents using the machine learning algorithm, where the output documents are relevant to the particular field of analysis based on the data references. Additionally, the method includes presenting one or more answers for one or more of the output questions using a graphical user interface.

In a third aspect, the disclosure describes a non-transitory computer readable medium storing a set of instructions that, when executed by one or more processors of a computing device, cause the computing device to perform functions. The functions include receiving electronic documents, seed dataset documents, and pre-fill questions, where the electronic documents are a set of documents to be processed by a pre-fill engine of the computing device, where the seed dataset documents comprise a set of documents providing reference for the pre-fill engine, and where the pre-fill questions comprise a set of questions to be answered using the pre-fill engine. Additionally, the functions includes determining output data from the electronic documents and data references to enable navigation through the electronic documents using a machine learning algorithm executed by the computing device, where the output data comprise data relevant to a particular field of analysis, and where the data references rely upon terminology, categories, classifications and ontology of the particular field of analysis. In addition, the functions further include determining output questions from the set of pre-fill questions and data references to enable navigation through the electronic documents using the machine learning algorithm, where the output questions are relevant to the particular field of analysis. Furthermore, the functions includes determining output documents from the seed dataset documents and data references to enable navigation through the electronic documents using the machine learning algorithm, where the output documents are relevant to the particular field of analysis. The functions further include presenting one or more answers for one or more of the output questions using a graphical user interface.

BRIEF DESCRIPTION OF THE FIGURES

The above, as well as additional, features will be better understood through the following illustrative and non-limiting detailed description of example embodiments, with reference to the appended drawings.

FIGS. 11, 12, 13, and 14 show displays of a user interface related to a client subsystem, according to an example embodiment.

DETAILED DESCRIPTION

Figure 1:
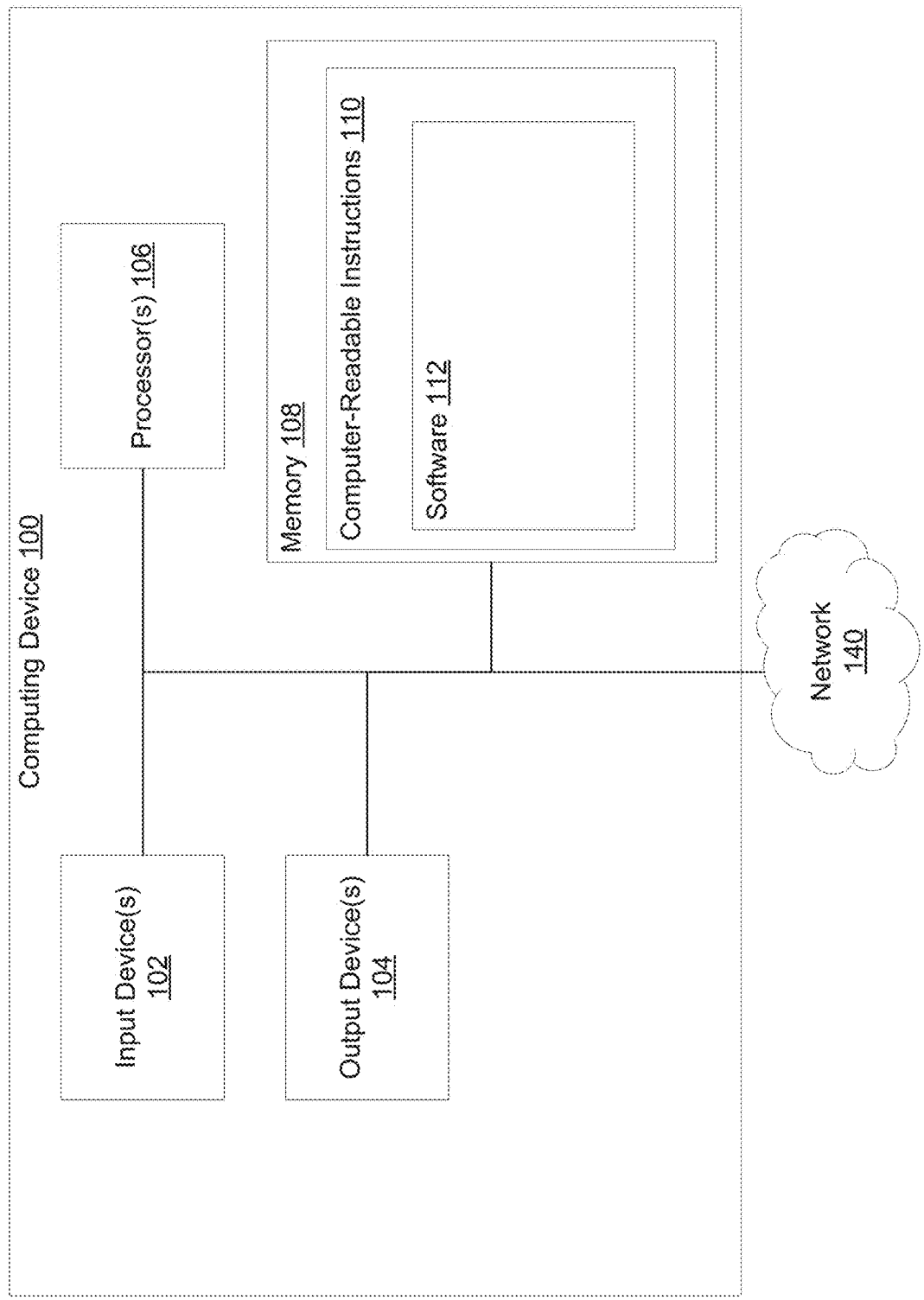
FIG. 1 is a schematic block diagram illustrating a computing device, according to an example embodiment.

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

I. Overview

Herein are described techniques that relate to systems and methods for extracting data from formatted and non-formatted documents using machine learning algorithms to answer relevant questions. A machine learning algorithm is an algorithm that is able to use data to progressively improve performance of one or more tasks without being explicitly programmed to perform the task(s). For example, a machine learning algorithm can be used to extract information from documents. Some machine learning algorithms that extract information from documents can handle non-formatted documents as input and extract sought-after information as output, with little re-training.

The machine learning algorithms can operate on domain-specific documents of various formats. Domain-specific documents related to insurance can include, for example, insurance-related documents related to evaluating an insurance application of an individual or company. The insurance-related documents can come in various different formats, including some insurance-related documents that have no specific format. Extracting information from the insurance-related documents can involve determining questions that clarify and/or augment the extracted information, where the questions can be based on an understanding of how the insurance-related information will be applied. Extracting insurance-related information can provide a greater challenge based on a number of documents—extracting insurance-related information from tens of documents is relatively easy compared to extracting insurance-related information from hundreds, thousands, or even more documents.

The systems and methods described herein can efficiently and accurately read electronic documents included in a corpus of electronic documents, categorize the documents, and classify the data in accordance with, for example, the ontology of a domain. An ontology of a domain is a set of concepts and categories that shows their properties and the relations between them for the domain. A domain can be a specific activity or body of knowledge, for example, psychology, insurance, academia, athletics, finance, and/or another category. The ontology of a domain therefore can include a general category of definitions that can be used to group documents and data for the domain. The corpus of electronic documents can vary in size (e.g., from one to millions) and can include various document types and formats. The corpus can include, for example, insurance and non-insurance specific documents with differing content.

The systems and methods described herein can use a seed dataset (a set of example data) of domain relevant documents, a domain semantics dictionary, and a domain ontology to identify domain-specific documents and extract relevant data through machine learning algorithms. As described herein, machine learning algorithms can be applied to extract and classify relevant domain-specific information from electronic documents, especially in cases where manual techniques would be impractical; e.g., due to a large number of electronic documents, a large amount of data within some or all of the electronic documents, in cases where the electronic documents have varying formats, types, and/or content, in scenarios where time for processing of the electronic documents too short for manual techniques. In some embodiments, the systems and methods described herein can use a list of questions and a set of data to determine additional relevant questions to for extracting further, relevant data and to determine answers for the relevant questions. For example, if the system is performing a vehicle insurance analysis, it would not answer all available insurance-related questions, but only answer questions that are relevant to vehicle insurance. The system can go further and answer relevant questions for specific types of vehicle insurance, for example, vehicle insurance for convertible cars, for motorcycles, or for trucks.

Additional seed datasets may be generated from a corpus of electronic documents. This is done, for example, by training the seed dataset generator with additional words and phrases from the corpus of electronic documents. Additional domain-specific information can be added to domain-specific dictionaries and domain-specific ontologies based on the additional seed datasets. The domain-specific dictionaries and domain-specific ontologies can be systematically updated when, for example, new concepts, words, and/or phrases are uncovered through processing documents. For example, in the domain of insurance, insurance terminology and classifications can be added to update insurance semantics dictionaries and an insurance ontology using one or more seed datasets obtained from a corpus of electronic documents related to insurance. Then, a machine learning algorithm can be trained or re-trained using the additional seed datasets, the updated insurance semantic dictionaries and the updated insurance ontology. After training or re-training, the machine learning algorithm may be used again identify insurance documents, extract, and classify data from a corpus of documents and monitor performance. The herein-described machine-learning algorithm may be re-trained using new seed datasets or updating the insurance semantic dictionaries and insurance ontology until the desired performance is reached. The criteria to reach a desired performance can include a confidence level for the extracted, categorized, and classified data. The criteria can also include user feedback through the graphical user interface. Additionally, the confidence level can relate to a level of an ability of a machine-learning algorithm to accurately recognize a concept and map that concept to an ontology and/or a level of an ability of the machine-learning algorithm accurately translate the ontology to execute business rules For example, performance can be achieved when accuracy of the machine learning algorithm is at least a same level of accuracy as a human reviewer on at least a predetermined percentage (e.g., 75%, 80%, 90%, 95%) of the documents. Once the desired performance is reached with insurance documents identified and the relevant data classified to an insurance ontology, the information may be stored and manipulated for various purposes.

In some embodiments, the corpus of electronic documents can include documents and data related to a submission for an insurance quote from an insurance carrier or agent. Insurance carriers and agents typically process documents to analyze and provide quotes for insurance policies in a short period of time (e.g., as little as a few minutes in some cases). A single insurance carrier or agent may quote hundreds to thousands of policies every month, requiring thousands of documents to be processed each month. The herein-disclosed systems and methods can significantly reduce the time and more accurately extract insurance relevant information than previous electronic systems and methods. Additionally, the systems and methods described herein can classify data according to an insurance ontology and therefore minimize risks due to missing relevant information and/or applying data in an incorrect (non-insurance) context. The systems and methods described herein enable a more accurate analysis and synthesis of the documents included in the corpus for an insurance context.

Reference will now be made in detail to example embodiments, the examples of which are illustrated in the accompanying drawings. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments. Whenever possible, the same reference numbers will be used throughout the drawings to refer to the same or like parts.

II. Example Systems

FIG. 1 is a schematic block diagram illustrating a computing device 100, in accordance with at least some example embodiments. In some embodiments, computing device 100 can be configured to perform the herein-described functions related to extracting data from unformatted documents.

Computing device 100 can include one or more input devices 102, one or more output devices 104, one or more processors 106, one or more and memory 108. It can also include one or more computer-readable instructions 110 and software 112. Computing device 100 can be further connected to network 140.

Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other input devices 102 are possible as well. Network 140 can be a local area network (LAN) or wide area network (WAN) that can include wired and/or wireless connections. Network 140 can allow the computing device 100 to connect to, for example, the internet where the computing device 100 can access third party websites.

Output devices 104 can include user display devices, audio devices, and/or network output devices. Processors 106 can include one or more general purpose processors, central processing units (CPUs), CPU cores, graphical processing units (GPUs), digital signal processors (DSPs) and/or other more special purpose processors.

Memory 108 can include one or more non-transitory machine-readable storage media configured to store data and/or instructions. In particular, memory 108 can store machine-readable instructions 110 that, when executed by processor 106, can cause a computing device to perform functions, such as but not limited to, functions of herein-described devices, networks, methods, features, and scenarios. In particular, machine-readable instructions 110 can include instructions for herein-described pre-fill software 112.

Figure 2:
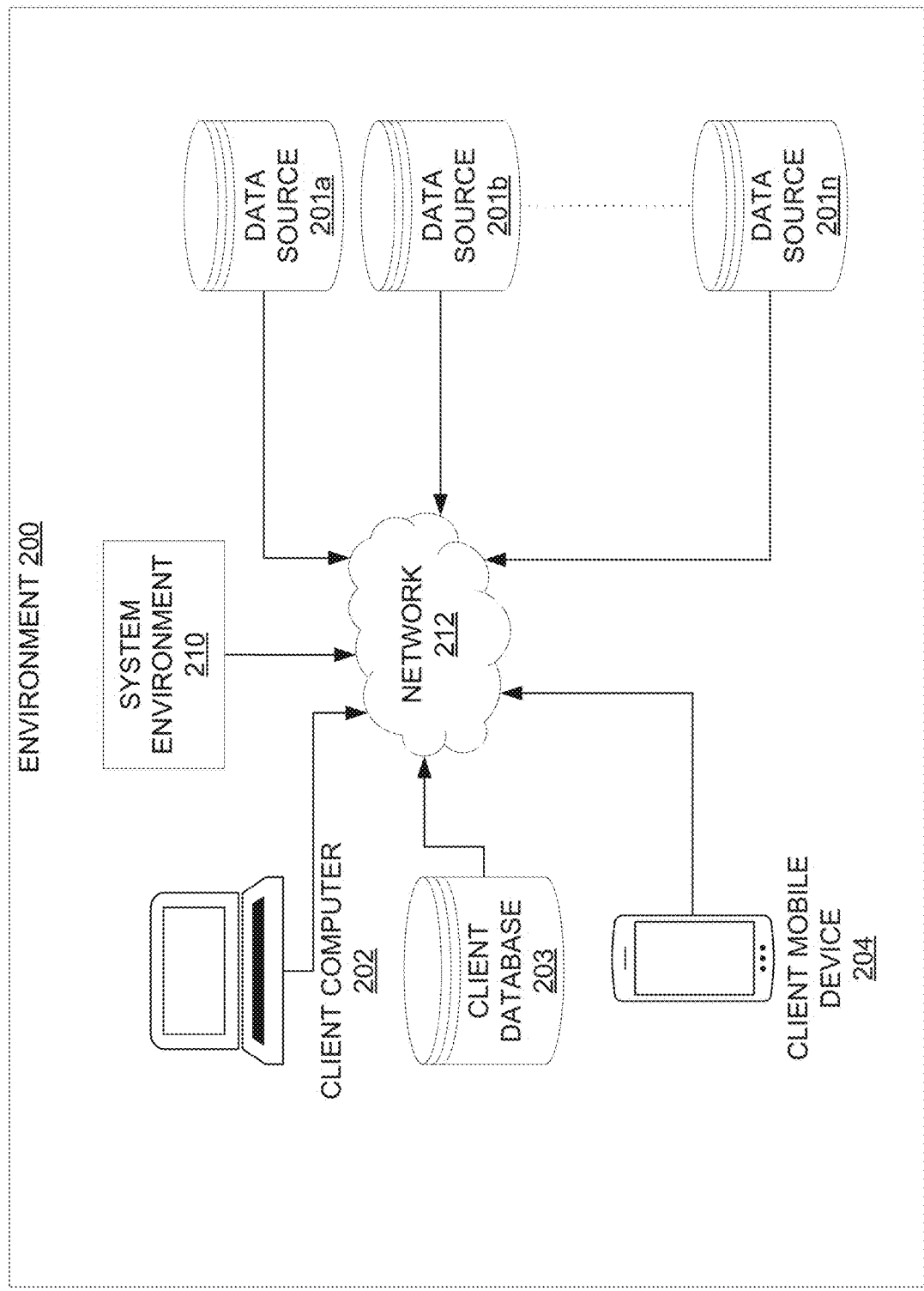
FIG. 2 is a block diagram of an example system for extracting data from domain documents, according to an example embodiment.

FIG. 2 is a block diagram of an example network 200, in accordance with at least some example embodiments. Network 200 includes client computer 202, client database 203, client mobile device 204, system environment 210, data sources 201a, 201b, . . . 201n, and network 212. In some examples, network 212 can have more, fewer, and/or different types of computing devices, servers, data sources, nodes, and/or system environments.

Data sources 201a, 201b, . . . 201n can include data servers from various sources on the internet or within the network 212 which can hold documents, questions, or other data used by the system. Data sources can be accessed by the system through network 212 to extract relevant data from a set of documents. System environment 210 can include the admin subsystem 301 and client subsystem 302 (e.g., as discussed in the context of at least FIG. 3-5). The client computer 202 can be used by the user or, for example, an insurance carrier or broker, to access the system through network 212. The client database 203 can be a database that holds user or client documents and/or other data. Client mobile device 204 can be a device with network capabilities which can be used to access the network 212 and the system environment 210.

Figure 3:
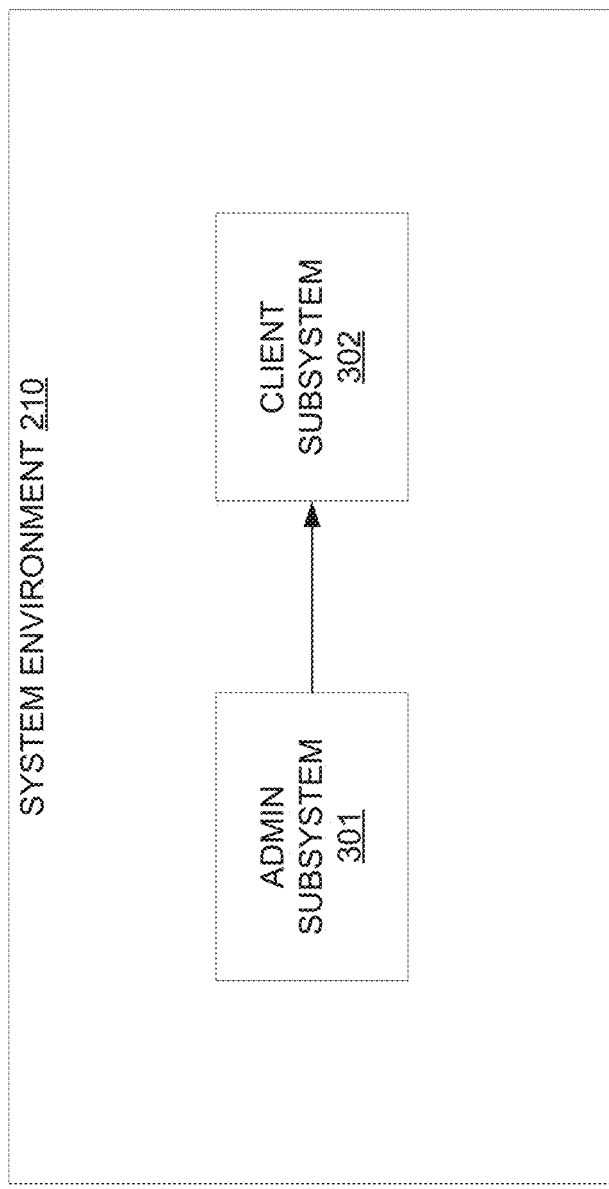
FIG. 3 is a block diagram of an example system environment, according to an example embodiment.

FIG. 3 is a block diagram of an example system environment 210, in accordance with at least some example embodiments. For example, system environment 210 can be an environment for one or more domain-specific systems; e.g., an insurance evaluation system and/or other insurance-specific systems. System environment 210 can include admin subsystem 301 and client subsystem 302. Admin subsystem 301 can be used to manage a database environment for the insurance evaluation system (e.g., as discussed in the context of at least FIG. 4). Client subsystem 302 can enable user interaction with the insurance evaluation system (e.g., as discussed in the context of at least FIG. 5). FIG. 3 illustrates that admin subsystem 301 communicates with client subsystem 302 to perform functionality for the insurance evaluation system.

Figure 4:
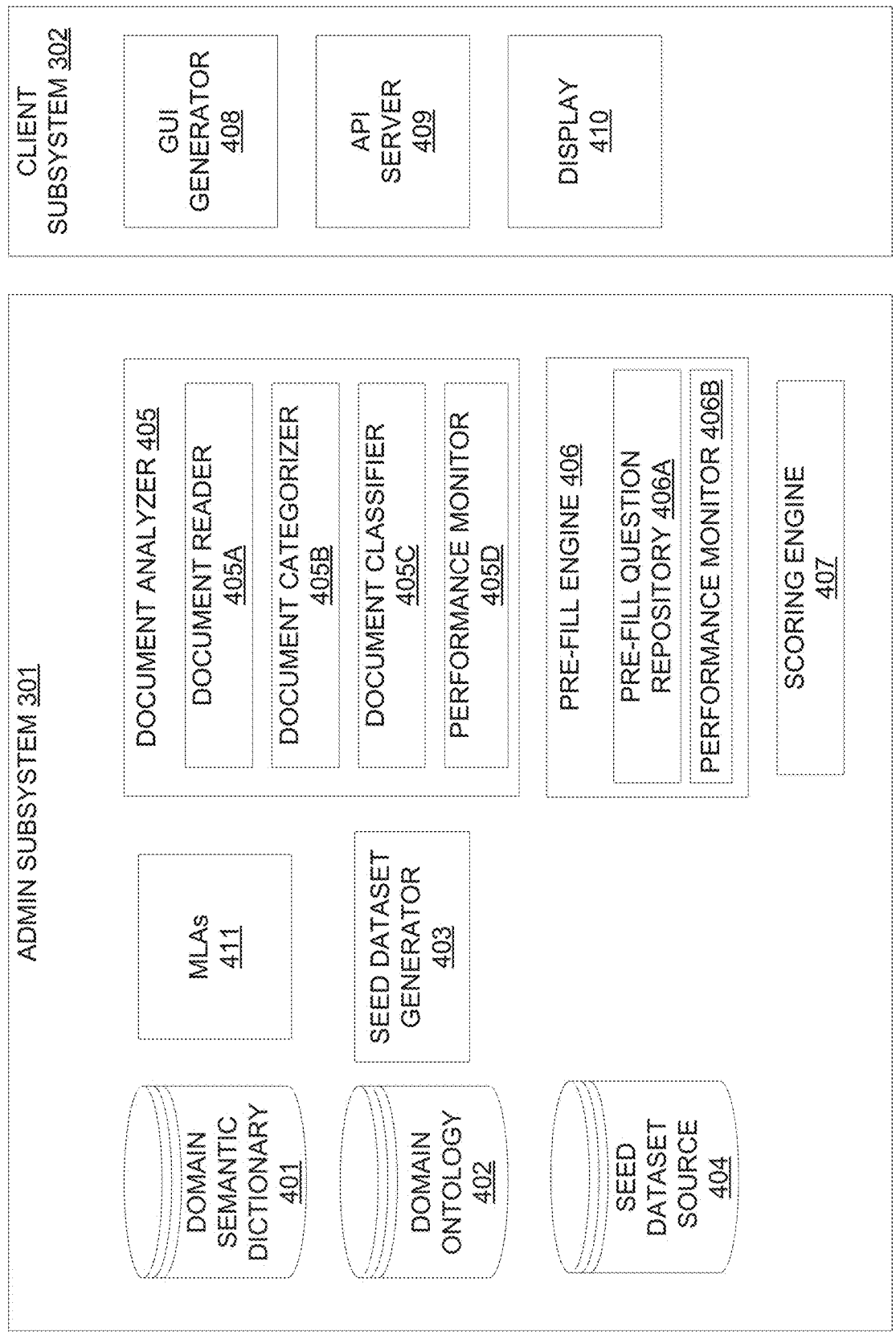
FIG. 4 is a block diagram of example admin and client subsystems, according to an example embodiment.

FIG. 4 is a block diagram of an example admin subsystem 301 and client subsystem 302, in accordance with at least some example embodiments. FIG. 4 does not show all the connections between the components for clarity's sake. The admin subsystem 301 can be used to extract data from documents, determine relevant questions and their answers, and score the overall documents being analyzed for the user to view through the client subsystem 302. Admin subsystem 301 includes domain semantic dictionary 401, domain ontology 402, seed dataset generator 403, seed dataset source 404, document analyzer 405, pre-fill engine 406, scoring engine 407, and one or more machine learning algorithms (MLAs) 411. FIG. 4 shows that document analyzer 405 has document reader 405A, document categorizer 405B, document classifier 405C, and performance monitor 405D. FIG. 4 also shows that pre-fill engine 406 has pre-fill question repository 406A and performance monitor 406B.

Client subsystem 302 can provide a user interface for accessing the admin subsystem 301. The client subsystem 302 includes graphical user interface (GUI) generator 408, application programming interface (API) server 409, and display 410.

The domain semantic dictionary 401 can include a database of domain-specific words. For example, in the domain of insurance, domain semantic dictionary 401 can store insurance-specific words. The domain-specific words in domain semantic dictionary 401 can be used by document analyzer 405 to determine whether one or more words within a document are related to the domain; e.g., in examples where domain semantic dictionary 401 stores insurance-specific words, document analyzer 405 can compare words extracted from a document to the insurance-specific words stored in domain semantic dictionary 401 to determine whether the words extracted from the document are related to insurance. Document analyzer 405 further categorizes and classifies the words extracted from the document (e.g., as discussed in the context of at least FIGS. 5-8).

Domain ontology 402 can include a database of domain-specific categories. For example, in the domain of insurance, domain ontology 402 can store insurance specific categories that can be used by the document categorizer 405B within document analyzer 405 to determine what data are related to insurance within a document and what data would be part of each category. For example, when determining whether to insure a building, categories for building insurance analysis can include roof characteristics and fire protection capabilities. After the document analyzer 405 provides extracted words from the document reader 405A, the roof characteristics and fire protection capabilities categories can be used to extract information related to how much risk insuring the building would entail. Within the roof characteristics category, the age of the building roof and what materials it is made out of can be extracted from the corpus of documents and the roof age and material data can be categorized using the category of roof characteristics. Within the fire protection category, the amount of smoke detectors within the building can be similarly extracted from the corpus of documents and the smoke detector data can be categorized using the category of fire protection capabilities.

A seed dataset generator 403 can generate relevant data that can be used by the pre-fill engine 406, along with the domain output document, to identify relevant questions which are to be answered with the relevant data extracted. The relevant questions can be identified from the set of questions in the pre-fill question repository 406A. The pre-fill engine 406 can take the domain output document, which includes the classified and categorized domain words that were extracted from the corpus of documents, to select questions from the set of pre-fill questions in the pre-fill question repository 406A. Based on the categories in the domain output document, pre-fill engine 406 can determine which of the selected questions are relevant and answer the relevant questions using the extracted domain data (e.g., as discussed in the context of at least FIG. 9). The seed dataset generator 403, when the accuracy of answers to the pre-fill questions goes below a threshold level, can reach back to the corpus of documents and identify additional datasets aligned with the relevant questions to generate further relevant data. The additional datasets can be identified by, for example, identifying concepts within the corpus of documents using the domain ontology. The pre-fill engine 406 can further determine whether additional relevant questions are needed using the performance monitor 406B and machine learning algorithms 411, based on new categories, new classifications or new terminology found by the document analyzer 405. The pre-fill engine 406 can use these questions and answer them using the data extracted. The pre-fill engine 406 can also store these new questions in the pre-fill question repository 406A (e.g., as discussed in the context of at least FIG. 9).

The seed dataset source 404 can be a database that stores data extracted by the document reader 405A within document analyzer 405 and used by the seed dataset generator 403 to generate additional relevant data. The seed dataset source 404 can further be used by the scoring engine 407 to generate a score that numerically represents a scoring analysis of the information used to answer relevant questions. The scoring analysis can depend on determining an information confidence level. The information confidence level is determined by analyzing the quality and quantity of words extracted, categorized, and classified by document analyzer 405. Determining the quality of words extracted, categorized, and classified can involve determining words in the document and that signal important information. Determining the quantity of the words extracted, categorized, and classified can involve counting a number of times a word was found in the corpus of documents. If the quality and quantity of words extracted are relatively low based on one or more thresholds (e.g., if the quantity of extracted words is below a threshold number of words, if a quality value of extracted words is below a threshold quality value, if a ratio of the quantity of extracted words to a total quantity of words is below a threshold ratio value), then a scoring analysis could not be done since there would not be enough information to calculate a score. The information confidence level analysis can further include determining how many relevant questions were found and answered.

The scoring analysis can then also include analyzing the answers to the relevant questions by determining if the answers contain dispositive information known to affect the overall analysis. For example, if a car insurance analysis involves answers to questions related to the type of driver and determines that the driver has multiple speeding tickets and car accidents, then the score provided by the scoring analysis would show that the insurance risk is high by displaying a low score. Similarly, if the insurance risk is low, the score displayed would be high. This is taking into consideration all the data extracted, categorized, and classified. For example, in the same analysis, the analysis may only find that there is no speeding tickets or car accidents but very little other information, like whether the driver has a driver's license, then not enough information is presented to give a high score. The document analyzer 405 has document reader 405A that can extract domain words from a corpus of documents using machine learning algorithms such as MLA 411 (e.g., as discussed in the context of at least FIG. 6). The document analyzer 405 further has document categorizer 405B that can categorize the extract domain words using machine learning algorithms 411 (e.g., as discussed in the context of at least FIG. 7). The document analyzer also has document classifier 405C that can classify the categorized domain words using machine learning algorithms 411 (e.g., as discussed in the context of at least FIG. 8). The document analyzer has performance monitor 405D that can be used by the document reader 405A, document categorizer 405B, and document classifier 405C to determine if a new domain word is detected, a new category is detected, and/or if a new classification is detected, respectively.

Scoring engine 407 takes the information from the seed dataset source 404 to determine, based on the data extracted and questions answered what type of risk the documents show. For example, if the pre-fill engine 406 and the document analyzer 405 extract data that is determined to show a poor evaluation, then the scoring engine 407 can provide a low score, and if it shows a positive evaluation, then it can show a high score (e.g., as discussed in the context of at least FIG. 9).

The GUI generator 408 can include a user interface that generates a display for the administrator to interact with the system (e.g., as discussed in the context of at least FIG. 12-15). The API server 409 can be an interface between the GUI generator 408 and the display 410. The display 410 can show the user interface generated by the GUI generator 408 to the administrator (e.g., as discussed in the context of at least FIG. 12-15).

Machine learning algorithms 411 can include one or more artificial intelligence or "machine learning" algorithms are able to use data to progressively improve performance of one or more tasks without being explicitly programmed to perform the task(s). Machine learning algorithms 411 can include, but are not limited to, decision tree learning algorithms, association rule learning algorithms, artificial neural networks algorithms, deep learning algorithms, inductive logic programming, support vector machines, clustering algorithms, Bayesian networks algorithms, reinforcement learning algorithms, representation learning algorithms, similarity learning algorithms, sparse dictionary learning algorithms, genetic algorithms, rule-based machine learning algorithms, learning classifier systems, and feature selection approach algorithms. Machine learning algorithms 411 can use one or more different machine learning techniques; for example, machine learning algorithms 411 can include both supervised learning and unsupervised learning techniques. Supervised learning techniques can include semi-supervised learning, active learning, and reinforcement learning techniques. Unsupervised learning techniques can include one or more techniques based on anomaly detection algorithms, neural networks, and clustering algorithms like k-nearest neighbors algorithm, hierarchical clustering algorithms, Gaussian mixture models, self-organizing maps, and/or Hidden Markov models. Machine learning algorithms 411 can provide outputs including outputs for classification, regression, clustering, density estimation, and/or dimensionality reduction of input data.

Figure 5:
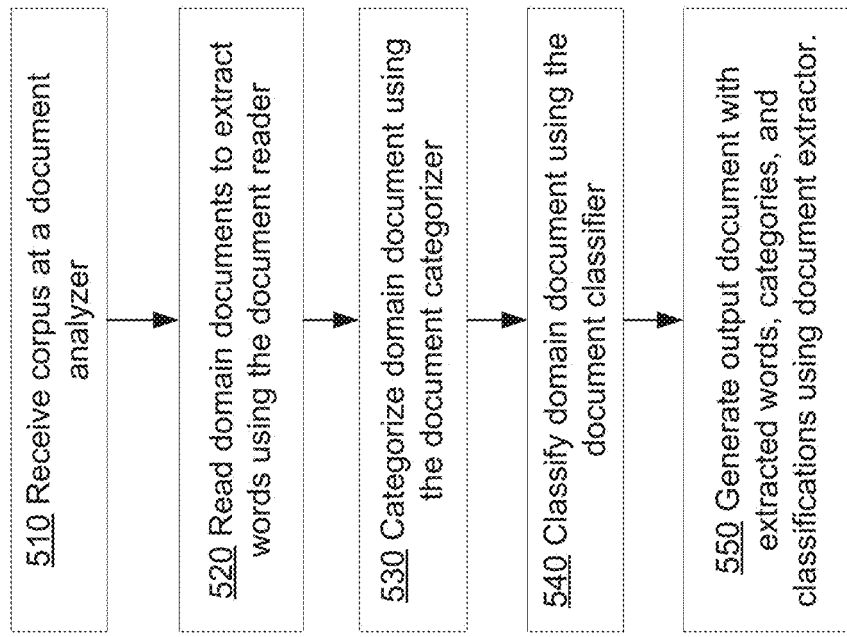
FIG. 5 is a flow chart representing an example method for extracting data from domain documents, according to an example embodiment.

FIG. 5 is a flow chart of example method 500 to be performed by a document analyzer, such as document analyzer 405, in accordance with at least some example embodiments. Method 500 can begin at block 510, where the document analyzer can receive a corpus of documents to be analyzed. At block 520, the document reader within the document analyzer can read a domain document by extracting each word in the domain document using the domain semantic dictionary 401. This is done comparing words in the domain document to words in domain semantic dictionary 401 and extracting words from the domain document that match words domain semantic dictionary 401. For example, if the domain is home insurance, then the domain semantic dictionary 401 will include words that relate to home insurance, like fire protection, flood records, hurricane zones, permits, home value, number of floors, if there is a basement, and/or various other words or terms that can provide information about insuring a home. At block 530, the document categorizer within the document analyzer can further categorize the domain document using the domain ontology 402 and machine learning algorithms 411. The document analyzer, for example, using extracted words and phrases from a given document, while maintaining the document structure, determines to which category best-fit the words and phrases. For example, the analyzer will take a set of words and phrases like fire alarm, roof age, and house, and determine if they best fit the categories available, for example, life insurance or home insurance. In another example, if the analysis includes life insurance, the categories can include a medical record category that can include any extracted data that relates to the applicant's medical records. This can include last doctor's visit, surgeries, recorded medical problems, family background.

At block 540, the document classifier within the document analyzer can further classify domain document into classifications that contain domain-specific categories. This is done by analyzing the words extracted, the categories used, and determining which class each best-fit the available categories. For example, if the analysis includes life insurance and the categories include medical records, age, sex, and drug use, the classification can include a health classification that can include any category that relates to the applicant's health. This can include medical records and drug use. At block 550, the document analyzer can generate an output document with the extracted words, categories, and classifications.

Figure 6:
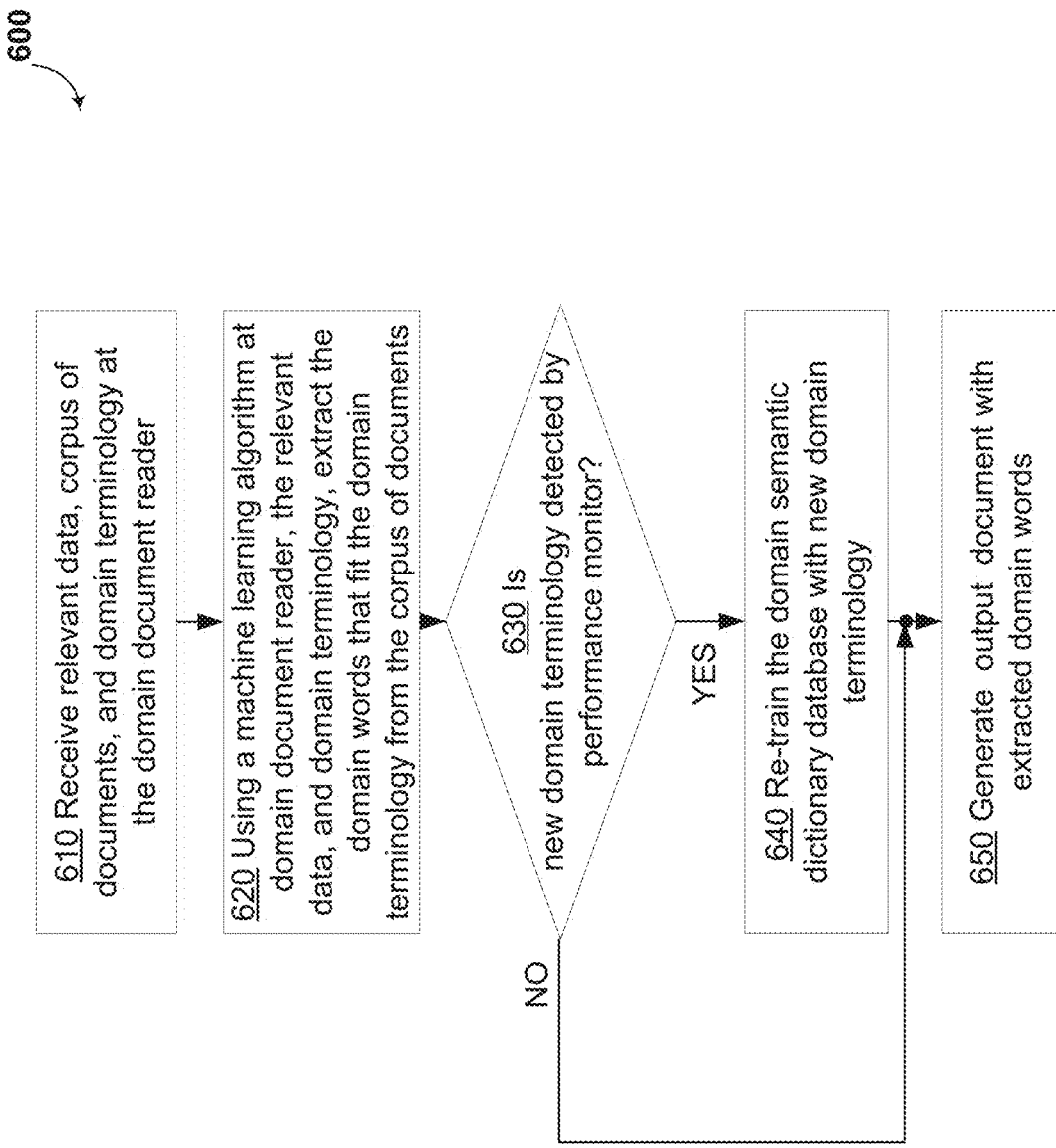
FIG. 6 is a flowchart of an example method, according to an example embodiment.

FIG. 6 is a block diagram of an example method 600 to be performed by a domain document reader, such as the document reader 405A within the document analyzer 405, in accordance with at least some example embodiments. Method 600 can begin at block 610, where the domain document reader can receive relevant data, a corpus of documents, and domain terminology to be analyzed. The corpus of documents can include legal documents, invoices, quotes, contracts, reports, spread sheets, certificates, permits, forms, applications, guarantee, agreements, and/or architectural plans. At block 620, the domain document reader, using machine learning algorithms 411, the relevant data, and domain terminology, can extract the domain words that fit the domain terminology from the corpus of documents. Word extraction can involve using the domain terminology and relevant data to search for words that are the same or similar as the terminology and are the same or similar to the relevant data.

At block 630, the document analyzer's performance monitor determines from the, whether new domain words or terminology are detected in the domain words extracted at block 620. This is done by determining if one or more new words are found that is relevant to the analysis and not in the domain terminology database. For example, a new insurance term can been identified, such as the term "admission" which relates to hospital inpatient care for medical reasons. If the one or more new words are found, then block 640 can be executed. If no new words are found, then block 650 can be executed.

At block 640, the domain document reader re-trains the domain semantic dictionary database with the new domain term. The domain semantic dictionary database can be re-trained by, for example, re-running a language model and further continuing to improve the language model. At block 650, the domain document reader generates an output document with the extracted domain words. In some examples, the extracted domain words can be output using other techniques than an output document; e.g., output to a display, a data structure, application programming interface, etc.

Figure 7:
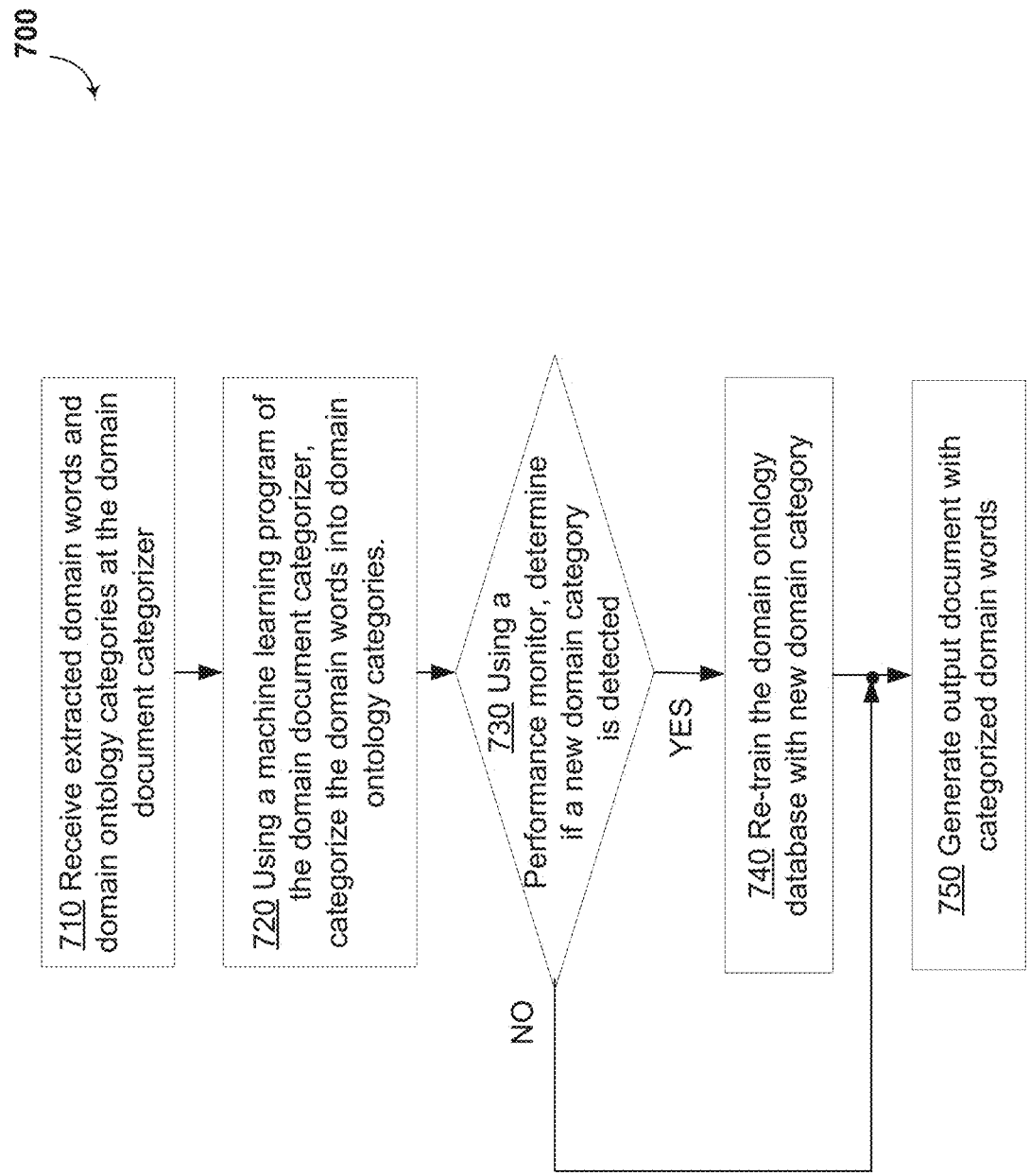
FIG. 7 is a flowchart of an example method for categorizing an electronic domain document, according to an example embodiment.

FIG. 7 is a block diagram of an example method 700 to be performed by a domain document categorizer, such as the document categorizer 405B within the document analyzer 405, in accordance with at least some example embodiments. Method 700 can begin at block 710, where the domain document categorizer can receive domain ontology categories and extracted domain words from block 650 of method 600 to be analyzed. For example, the domain words can be extracted using the procedures of method 600.

At block 720, the domain document categorizer can use machine learning algorithms 411 to categorize the domain words into domain ontology categories. At block 730, the document analyzer's performance monitor, determines whether a new domain category is detected. A new domain category is detected, in one example, when the words and phrases extracted do not best-fit the available ontology categories. For example, if the machine learning algorithm does not match enough words or phrases like bulldog, age, gender, and health to the available domain ontology categories like life insurance and house insurance. In such example, a new domain ontology category may be detected to cover pet health insurance. In another example, when one or more domain words that do not meet the characteristics of the domain ontology categories or that extracted words meet the characteristics of multiple domain ontology categories. For example, for a life insurance analysis, a new insurance category can been identified, such as the "genetic makeup" which relates to genetic information that may give information about the health risk an applicant can have. At that point, the domain document categorizer can determine what the words have in common and determine if a new category is detected. If the domain document categorizer detects a new category, then block 740 can be executed. If the domain document categorizer does not detect a new domain category, then block 750 can be executed.

At block 740, the domain document categorizer re-trains the domain ontology database with the new domain category. The domain ontology database can be re-trained by, for example, re-running a model and continuing to improve the model through training. At block 750, the domain document categorizer generates an output document with the extracted domain words. In some examples, the categorized domain words can be output using other techniques than an output document; e.g., output to a display, a data structure, application programming interface, etc.

Figure 8:
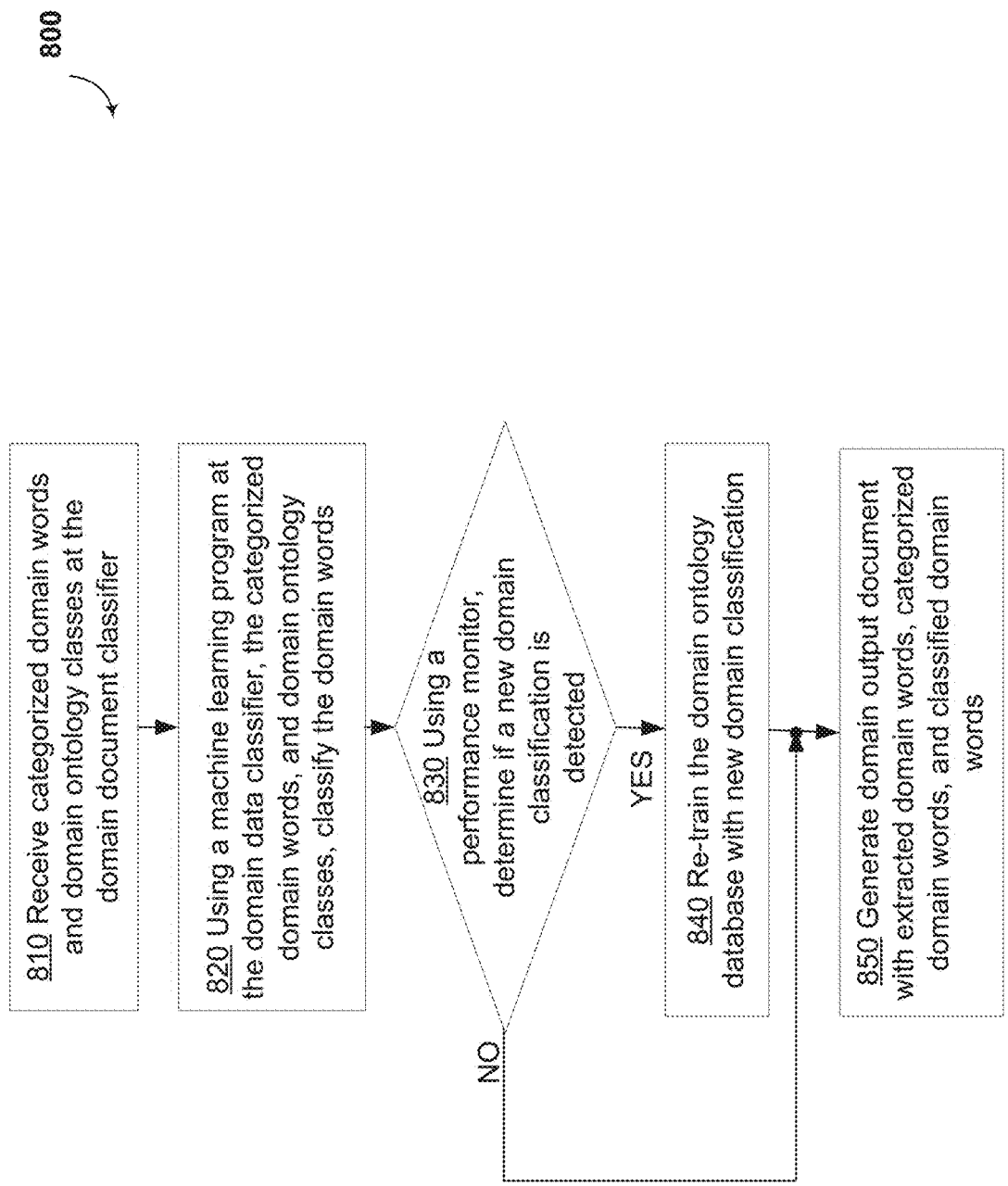
FIG. 8 is a flowchart of an example method for classifying domain document data, according to an example embodiment.

FIG. 8 is a block diagram of an example method 800 to be performed by a domain document classifier, such as the document classifier 405C within the document analyzer 405, in accordance with at least some example embodiments. Method 800 can begin at block 810, where the domain document classifier receives categorized domain words and domain ontology classifications to be analyzed. For example, domain words can be categorized using the procedures of method 700.

At block 820, the domain document classifier, using machine learning algorithms 411, the categorized domain words, and domain ontology classifications, can classify the domain categories into one or more classifications. At block 830, the document analyzer's performance monitor, determines if a new domain classification is detected. A new domain classification is detected, in one example, when there are various categories that do not meet the characteristics of an existing domain ontology classification or a category that meet the characteristics of multiple domain ontology classifications. A new domain classification is detected by determining if a new classification is found that is relevant to the analysis and not in the domain ontology database. For example, for a life insurance analysis, a new insurance classification can be identified, such as a "future indicators" classification that relates to information that gives an indication about future health of an applicant. This information can include information categorized into categories like genetic makeup, drug use, smoker, and other indicators that show indications about future health of the applicant. At that point, the domain document classifier can determine what the categories have in common and determine whether a new classification is detected. If a new classification is detected, then block 840 can be executed. If a new domain classification is not detected, then block 850 can be executed.

At block 840, the domain document classifier re-trains the domain ontology database by adding new domain classification to the database. At block 850, the domain document classifier generates a domain output document with the extracted domain words, categorized domain words, and classified domain words. In some examples, the extracted domain words, categorized domain words, and classified domain words can be output using other techniques than an output document; e.g., output to a display, a data structure, application programming interface, etc.

Figure 9:
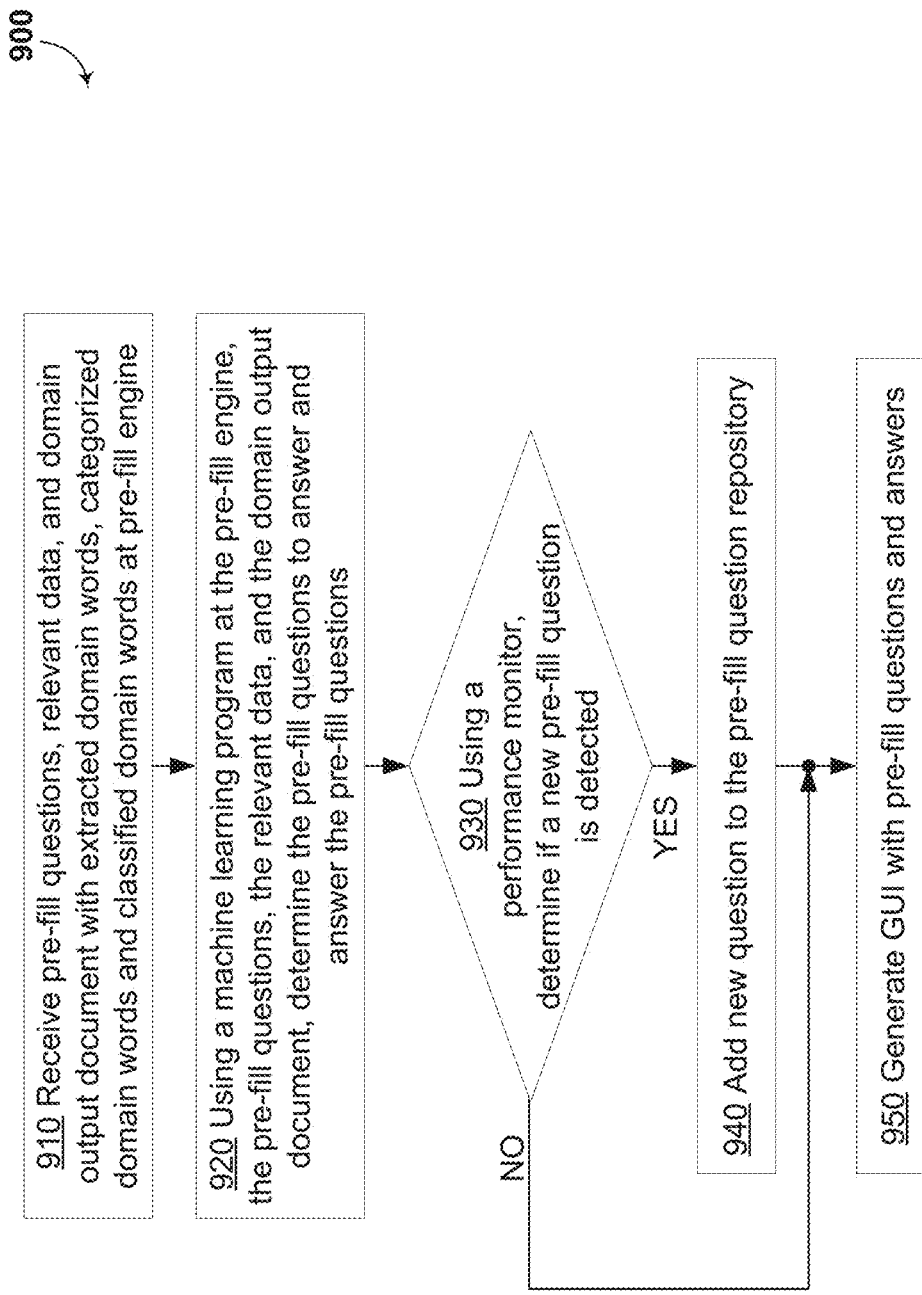
FIG. 9 is a flowchart of an example method for classifying domain document data, according to an example embodiment.

FIG. 9 is a block diagram of an example method 900 to be performed by a pre-fill engine, such as the pre-fill engine 406, in accordance with at least some example embodiments. Method 900 can being at block 910, where the pre-fill engine receives pre-fill questions, relevant data, and a domain output document with extracted domain words, categorized domain words, and classified domain words to be analyzed. For example, the domain output document with extracted domain words, categorized domain words, and classified domain words can be generated using method 800.

At block 920, the pre-fill engine, using a machine learning program such as machine learning algorithms such as MLA 411, the pre-fill questions, the relevant data, and the domain output document, determine which pre-fill questions are relevant and answer them. The relevant questions are determined using the categories and classifications used in the domain output document. At block 930, using the pre-fill engine's performance monitor, determine if a new pre-fill question is detected. A new question is detected, in one example, when there are various categories and classifications that do not answer the relevant pre-fill questions identified. This is done by determining if a new pre-fill question is found that is relevant to the analysis and not in the pre-fill question repository. In another example, when a form has a section to fill in certain information, a new pre-fill question can include a question for the certain information. For example, when analyzing home insurance, if a form has a section to fill in the estimated value of the house, a question can include what the estimated value of the house is. In another example, when analyzing car insurance, a form may have a formula to calculate, for example, the value of the car, the variables of the equation can be the used to determine new relevant questions. In an additional example, for a home insurance analysis, a new insurance question can been identified, such as the "how many smart smoke detectors are in the building" which is relevant to how home owners can react to a fire in the home. At that point, the domain document classifier can determine what the categories and classifications have in common and determine if a new pre-fill question is detected. In an additional example, the domain ontology can be adjusted to learn the concept the question is trying to answer. If a new pre-fill question is detected, then block 940 can be executed. If a new pre-fill question is not detected, then block 950 can be executed.

At block 940, the pre-fill question re-trains a pre-fill question repository by adding the new pre-fill question detected. At block 950, a display of a graphical user interface (GUI) is generated with the pre-fill questions and answers and subsequently displayed (e.g., as discussed in the context of at least FIG. 11-14). In some examples, the pre-fill questions and answers can be output using other techniques than a display; e.g., output to a file, a document, a data structure, application programming interface, etc.

Figure 10:
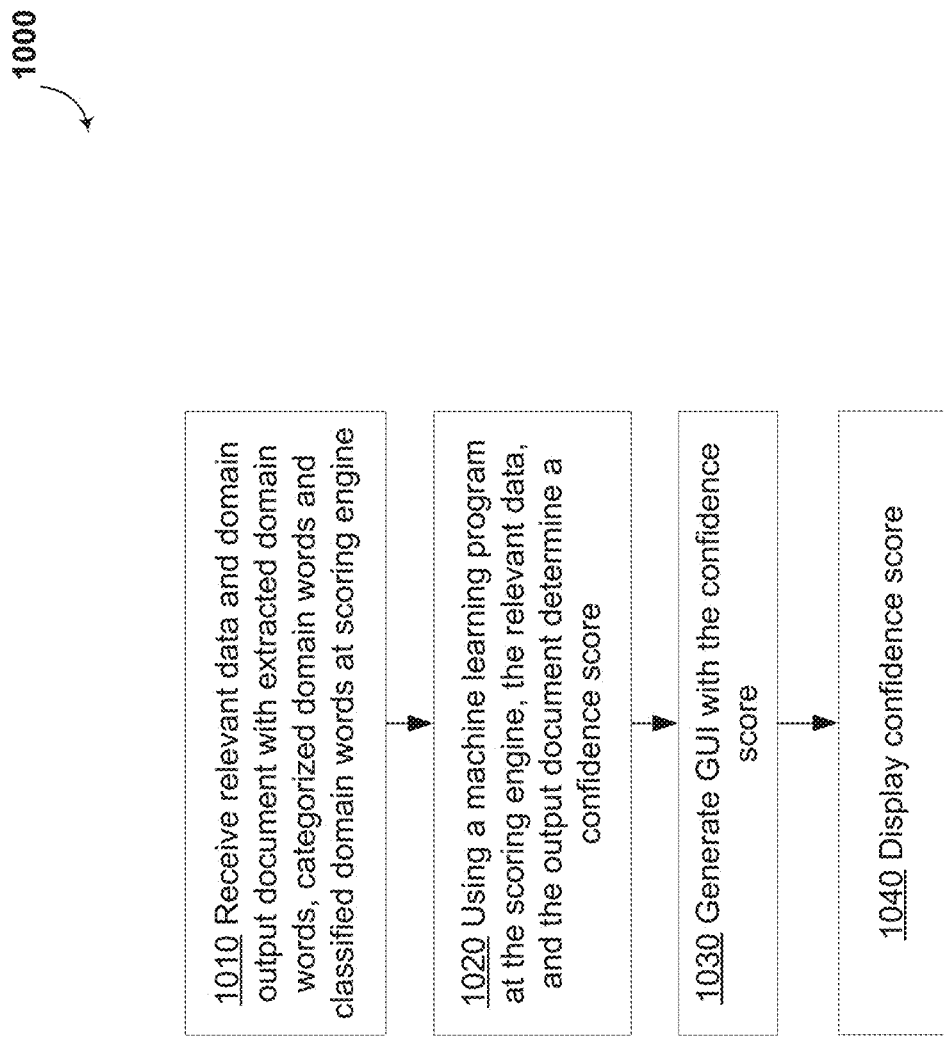
FIG. 10 is a flowchart of an example method for classifying domain document data, according to an example embodiment.

FIG. 10 is a block diagram of an example method 1000 to be performed by a scoring engine, such as the scoring engine 407, in accordance with at least some example embodiments. Method 1000 can begin at block 1010, where the scoring engine receives relevant data and a domain output document with extracted domain words, categorized domain words, and classified domain words. For example, the domain output document with extracted domain words, categorized domain words, and classified domain words can be generated using method 800.

At block 1020, the scoring engine, using machine learning program MLA 411, the relevant data and the domain output document, can determine a confidence score that represents a risk level that the system has for the documents analyzed. For example, if the documents relate to the risk to giving customer car insurance, the system will determine, based on the documents analyzed, the risk level that may be entailed by providing car insurance to the customer (e.g., as discussed in the context of at least FIG. 4). At block 1030, a GUI is generated with the confidence score. At block 1040, a display is generated to display the confidence score to a user (e.g., as discussed in the context of at least FIG. 11-15). In some examples, the confidence score can be output using other techniques than a display; e.g., output to a file, a document, a data structure, application programming interface, etc.

Figure 11:
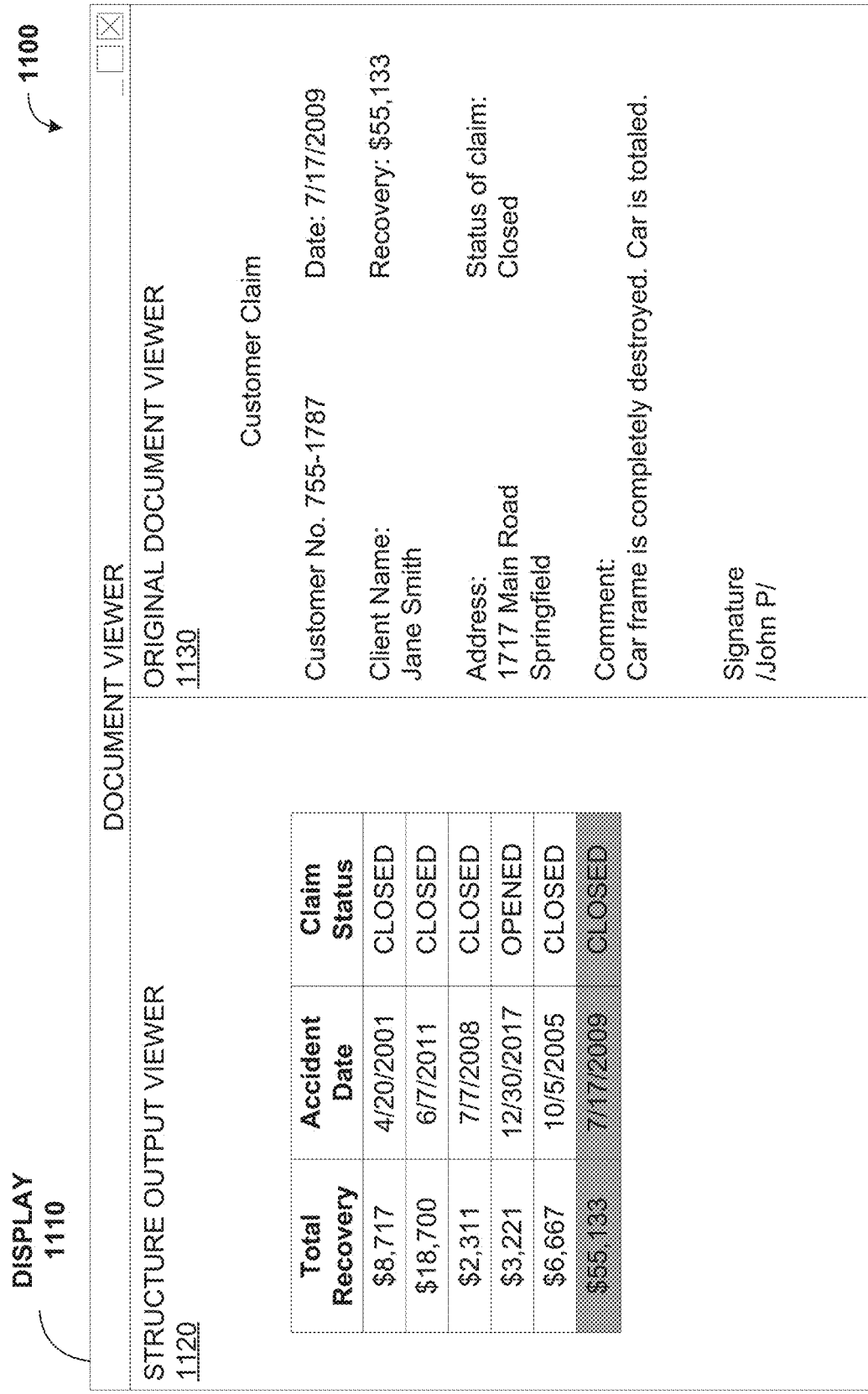

FIG. 11 shows a display 1110 of a user interface 1100 related to a user interface displaying data extracted from a set of documents and individual documents from the set of documents. The data can be extracted using the procedures of method 600. The display 1110 can have a structure output viewer 1120 and original document viewer 1130. The structure output viewer 1120 can display the data extracted from the set of documents. In the structure output viewer 1120, the table shows information related to auto insurance claims. The chart has three columns showing the total recovery, accident date, and claim status. The total recovery column shows amounts paid by an insurance company for the accident. The accident date shows dates when accidents occurred. The claim status column shows indicates status of claims; e.g., whether a claim is open, closer, or has another status. For example, in the first row of a table shown in structure output viewer 1120, data for a "CLOSED" claim indicates a recovery of "$8,717" for an accident on "4/20/2011." Similarly for the second claim in row three, data for a "CLOSED" claim indicates a recovery of "$18,700" for an accident on "6/7/2011." For the third claim in row four, data for a "CLOSED" claim indicates a recovery of "$2,311" for an accident on "7/7/2008." For the fourth claim in row five, data for an "OPENED" claim indicates a recovery of "$3,221" for an accident on "12/30/2017." For the fifth claim in row six, data for a "CLOSED" claim indicates a recovery of "$6,667" for an accident on "10/5/2005." For the sixth claim in row seven, data for a "CLOSED" claim indicates a recovery of "$55,133" for an accident on "7/17/2009."

The original document viewer 1130 can display one of the documents from the set of documents. In the example shown in FIG. 11, original document viewer 1130 shows a claim document for an auto insurance accident. Selecting a row of viewer 1120 can cause the related documents to be retrieved in original document viewer 1130. The user can compare the two viewers to verify that the information extracted from the documents is accurate. In the example shown in FIG. 11, original document viewer 1130 displays a customer claim document for an auto insurance accident corresponding to the sixth claim of structured document viewer 1120. For example, the document "Customer Claim" has a "Customer No. 755-1787" filed "Date: Jul. 17, 2009" by "Client Name: Jane Smith" having an "Address: 1717 Main Road Springfield" a "Recovery: $55,133" a "Status of Claim: Closed" with a "Comment: Car frame is completely destroyed. Car is totaled." and with a "Signature/John P/."

FIG. 12 shows a display 1210 of a user interface 1200 related to a set of relevant questions and corresponding answers for evaluating the documents. The relevant questions and corresponding answers can be determined using the procedures of method 900. The structure output viewer 1220 will have a column with a list of questions that the system finds relevant to be answered. The structure output viewer 1220 has a second column that can display the answers to the questions. The display 1210 can further allow the user to answer the displayed questions. The answers can then be used by the system to improve performance, to improve answering further questions, and to improve scoring. The system, in some examples, can also provide the answers to these questions using the extracted data and display them in display 1210. The structure output viewer 1220 displays questions related to building insurance. For example, in the second row of a table shown in structure output viewer 1220, data for a "Licensed Contractor?" indicates "Yes." Similarly for the second question in row three, the answer to question "Acquired Permit?" was "No." For the third question in row four, the answer to the question "Inspected before construction?" was "Yes." For the fourth question in row five, the answer to the question "Inspected after construction?" was "No." For the fifth question in row six, the answer to the question "Architectural plan?" was "Yes."

FIG. 13 shows a display 1310 of a user interface 1300 for a values viewer 1320. The values viewer 1320 can display the values of specific attributes from the set of documents. The attributes can be determined using the procedures of methods 500, 600, 700, 800, and/or 900. The values viewer 1320 can display attributes that represent information sought for an evaluation associated with the set of documents. In the example shown in FIG. 13, values viewer 1320 displays attributes related to a house insurance analysis for determine risk in insuring a house to allow an underwriter to determine the risk that the house would entail. The values viewer 1320 can also include values extracted from the corpus of documents for the attributes.

For example, the values viewer 1320 shows an extracted value of a "Year Built" attribute is "1985", an extracted value of a "Construction Type" attribute is "Wood", an extracted value of a "Number of Stories" attribute is "3", an extracted value of the "Roof Type" attribute is "Flat", and the extracted value of the "Roof Age" attribute is empty based on a lack of corresponding extracted information, and an extracted value of a "Pool" attribute is "1" representing one pool. The values viewer 1320 can also include a "D3" value column that provides information for each attribute based on an analysis of the documents. The "D3" value is different than the extracted value as the extracted value is the data directly extracted from a document and where the "D3" value is the value interpreted by the machine-learning algorithm from the set of documents. For example, the determined D3 value of the "Year Built" attribute is "1985", the extracted D3 value of the "Construction Type" attribute is empty based on a lack of corresponding extracted information, the extracted D3 value of the "Number of Stories" is "3", the extracted D3 value of the "Roof Type" is "Flat", and the extracted D3 value of the "Roof Age" attributed is "4", and the extracted D3 value of the "Pool" attribute is "1" representing one pool.

Figure 14:
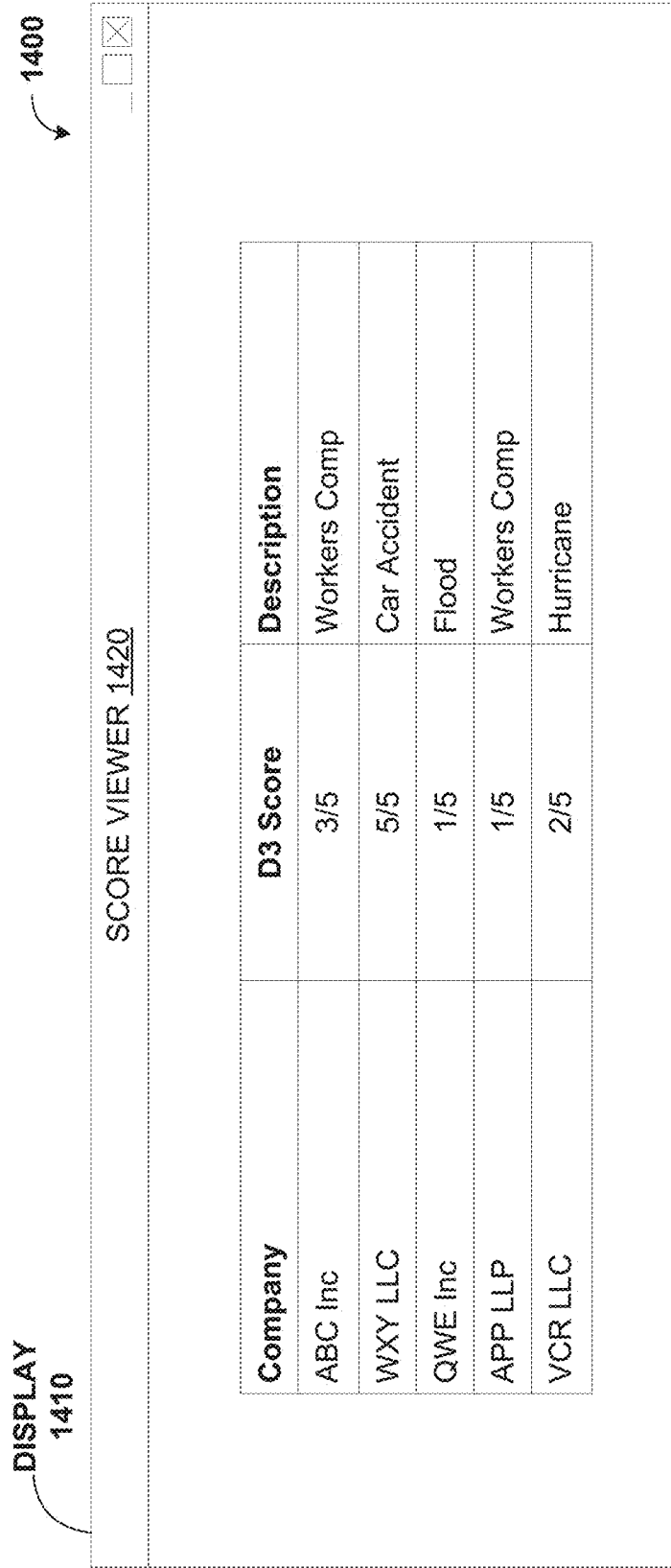

FIG. 14 shows a display 1410 of a user interface 1400 related to a score viewer. The score viewer 1420 has columns that display the confidence level that the system has related to each company it analyzed based on a set of documents. The score can be generated using the procedures of method 1000. The score viewer 1420 can have a column with a company's information listing all the companies it is analyzing. The column could also include individuals or properties. The score viewer 1420 can also have a d3 score that gives a confidence score for each company based on an analysis of the document set for each company. The score viewer 1420 can also have a description column that displays what the company was analyzed for and what the score relates to. For example, in the second row, the company "ABC Inc" had a "3/5" D3 score for a "Workers Comp" insurance analysis. For the third row, the company "WXY LLC" had a "5/5" D3 score for a "Car Accident" insurance analysis. For the fourth row, the company "QWE Inc" had a "1/5" D3 score for a "Flood" insurance analysis. For the fifth row, the company "APP LLP" had a "1/5" D3 score for a "Workers Comp" insurance analysis. For the sixth row, the company "VCR LLC" had a "2/5" D3 score for a "Hurricane" insurance analysis.

III. Example Methods of Operation

Figure 15:
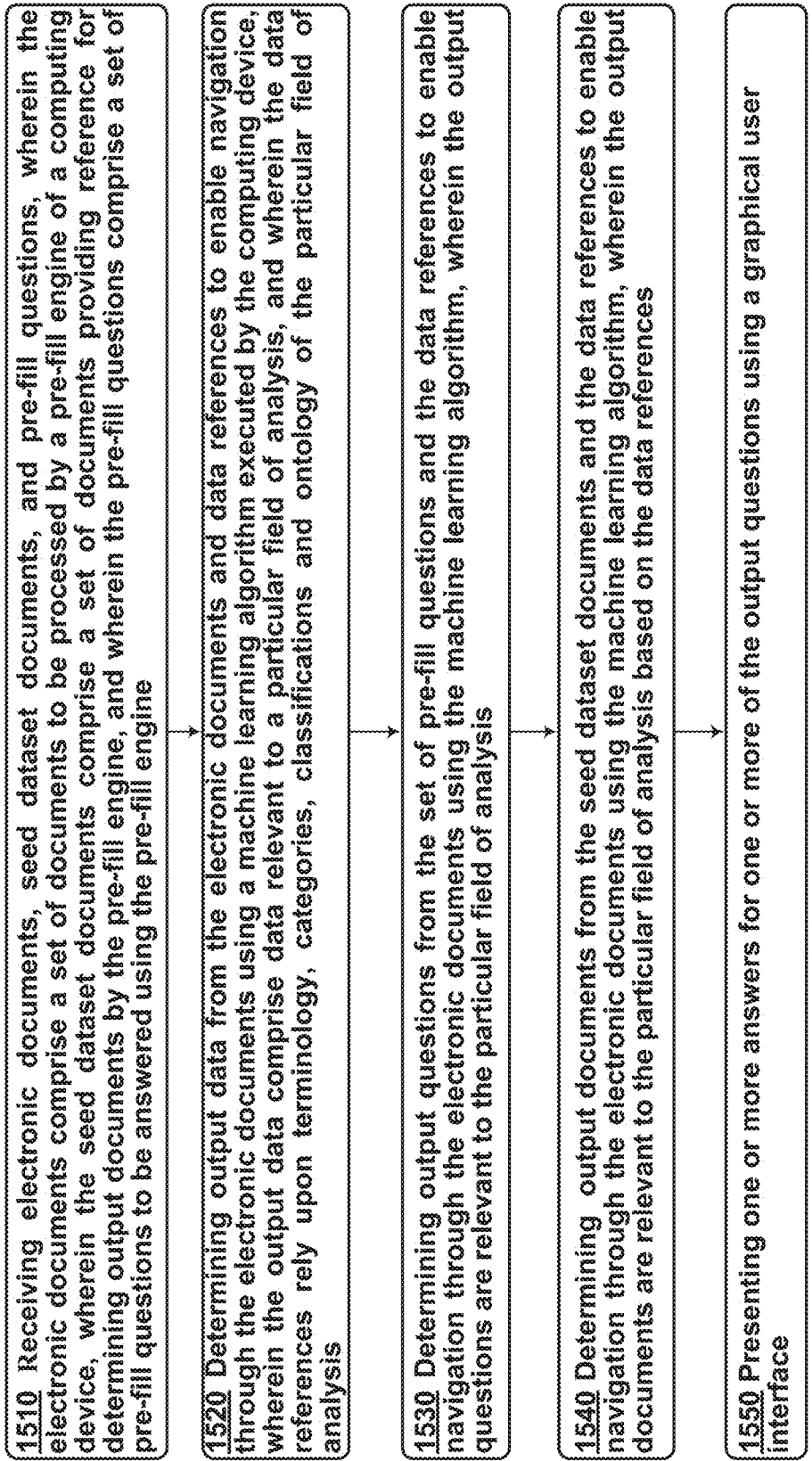
FIG. 15 shows a flowchart for a method, according to an example embodiment.

FIG. 15 is a flowchart of method 1500, in accordance with at least some example embodiments. Method 1500 can carried out by a computing device, such as computing device 100. Method 1500 can begin at block 1510, where the computing device can receive electronic documents, seed dataset documents, and pre-fill questions, where the electronic documents comprise a set of documents to be processed by the pre-fill engine, where the seed dataset documents comprise a set of documents providing reference for determining output documents by the pre-fill engine, and where the pre-fill questions comprise a set of pre-fill questions to be answered using the pre-fill engine, as discussed above herein in the context of at least FIG. 4.

In some examples, the method 1500 can further include receiving answers to one or more associated pre-fill questions of the set of pre-fill questions through the graphical user interface, as discussed above herein in the context of at least FIG. 12.

At block 1520, the method 1500 can include determining output data from the electronic documents and data references that enable navigation through the electronic documents using a machine learning algorithm executed by the computing device, where the output data comprise data relevant to a particular field of analysis, and where the data references rely upon terminology, categories, classification and ontology of the particular field of analysis, as discussed above herein in the context of at least FIG. 5-8.

At block 1530, the method 1500 can include determining output questions from the set of pre-fill questions and the data references that enable navigation through the electronic documents using the machine learning algorithm, where the output questions are relevant to the particular field of analysis, as discussed above herein in the context of at least FIG. 9.

In some examples, the method 1500 can further include generating additional output questions using the pre-fill engine, the pre-fill questions, and the data references, as discussed above herein in the context of at least FIG. 9.

At block 1540, the method 1500 can include determining output documents from the seed dataset documents and the data references to enable navigation through the electronic documents using the machine learning algorithm, where the output documents are relevant to the particular field of analysis according to the data references, as discussed above herein in the context of at least FIG. 9.

At block 1550, the method 1500 can include presenting one or more answers for one or more of the output questions using a graphical user interface, as discussed above herein in the context of at least FIG. 11-14.

In some examples, the method 1500 can include where at least part of the output data and at least one of the electronic documents are displayed side by side on one screen in the graphical user interface for verification, as discussed above herein in the context of at least FIG. 11.

In some examples, the method 1500 can include where the set of pre-fill questions are shown with corresponding answers on the graphical user interface, as discussed above herein in the context of at least FIGS. 12 and 13.

In some examples, the method 1500 can include where a score is displayed for an entity being evaluated and where the score is determined based on the output data and answers to the output questions, as discussed above herein in the context of at least FIG. 14.

In some examples, the method 1500 can further include a performance monitor and training the pre-fill engine by utilizing the performance monitor to provide user feedback to the machine learning algorithm, where the user feedback includes user verification of the output data, the output documents, and/or the one or more answers provided by the pre-fill engine, as discussed above herein in the context of at least FIG. 6-10.

In some examples, the method 1500 can further include a seed dataset generator, a first database, receiving documents at the seed dataset generator from the first database, and determining the output documents from the documents received from the first database, as discussed above herein in the context of at least FIGS. 4, 9 and 10. Additional in some examples, the method 1500 can further comprise where the first database includes data about one or more of: legal documents, invoices, quotes, contracts, reports, spread sheets, certificates, permits, forms, applications, guarantee, agreements, and/or architectural plans, as discussed above herein in the context of at least FIG. 6. In addition in some examples, the method 1500 can further comprise where the pre-fill engine searches one or more remote sources other than the first database as discussed above herein in the context of at least FIG. 9. Furthermore, in some examples, the method 1500 can further comprise where the pre-fill questions are obtained from the first database as discussed above herein in the context of at least FIG. 9.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. A system comprising:
  a memory device that stores at least a set of computer executable instructions for a machine learning algorithm, a pre-fill engine, and a performance monitor; and
  at least one processor that executes the instructions to perform functions that include:
    receiving electronic documents, seed dataset documents, and pre-fill questions, wherein the electronic documents comprise a set of documents to be processed by the pre-fill engine, wherein the seed dataset documents comprise a set of documents providing a reference for determining output documents by the pre-fill engine, and wherein the pre-fill questions comprise a set of pre-fill questions to be answered using the pre-fill engine;
    determining output data from the electronic documents and data references that enable navigation through the electronic documents using the machine learning algorithm, wherein the output data comprise data relevant to an insurance underwriting analysis, and wherein the data references rely upon terminology, categories, classifications and ontology relating to the insurance underwriting analysis;
    determining output questions from the set of pre-fill questions and the data references that enable navigation through the electronic documents using the machine learning algorithm, wherein the output questions are relevant to the insurance underwriting analysis;
    determining output documents from the seed dataset documents and the data references to enable navigation through the electronic documents using the machine learning algorithm, wherein the output documents are relevant to the insurance underwriting analysis according to the data references;
    presenting one or more answers for one or more of the output questions using a graphical user interface; and
    training the pre-fill engine by utilizing the performance monitor to provide user feedback to the machine learning algorithm, wherein the user feedback includes user verification of the output data, the output documents, and/or the one or more answers provided by the pre-fill engine.

2. The system of claim 1, wherein the system further includes a seed dataset generator and a first database, and wherein determining the output documents from the seed dataset documents comprises:
  receiving documents at the seed dataset generator from the first database; and
  determining the output documents from the documents received from the first database.

3. The system of claim 2, wherein the system further includes the first database, wherein the first database includes insurance underwriting analysis data relating to one or more of: legal documents, invoices, quotes, contracts, reports, spread sheets, certificates, permits, forms, applications, guarantee, agreements, and/or architectural plans.

4. The system of claim 2, wherein the pre-fill engine searches one or more remote sources other than the first database.

5. The system of claim 2, wherein the pre-fill questions are obtained from the first database.

6. The system of claim 1, further comprising:
  generating additional output questions using the pre-fill engine, the pre-fill questions, and the data references.

7. The system of claim 1, further comprising:
  receiving answers to one or more associated pre-fill questions of the set of pre-fill questions through the graphical user interface.

8. The system of claim 1, wherein at least part of the output data and at least one of the electronic documents are displayed side by side on one screen in the graphical user interface for verification.

9. The system of claim 1, wherein the set of pre-fill questions are shown with corresponding answers on the graphical user interface.

10. The system of claim 1, wherein a score is displayed for an entity being evaluated, and wherein the score is determined based on the output data and answers to the output questions.

11. A method, comprising:
  receiving electronic documents, seed dataset documents, and pre-fill questions, wherein the electronic documents comprise a set of documents to be processed by a pre-fill engine of a computing device, wherein the seed dataset documents comprise a set of documents providing reference for determining output documents by the pre-fill engine, and wherein the pre-fill questions comprise a set of pre-fill questions to be answered using the pre-fill engine;

determining output data from the electronic documents and data references to enable navigation through the electronic documents using a machine learning algorithm executed by the computing device, wherein the output data comprise data relevant to an insurance underwriting analysis, and wherein the data references rely upon terminology, categories, classifications and ontology relating to the insurance underwriting analysis;

determining output questions from the set of pre-fill questions and the data references to enable navigation through the electronic documents using the machine learning algorithm, wherein the output questions are relevant to the insurance underwriting analysis;

determining output documents from the seed dataset documents and the data references to enable navigation through the electronic documents using the machine learning algorithm, wherein the output documents are relevant to the insurance underwriting analysis based on the data references;

presenting one or more answers for one or more of the output questions using a graphical user interface; and training the pre-fill engine by utilizing a performance monitor to provide user feedback to the machine learning algorithm, wherein the user feedback includes user verification of the output data, the output documents, and/or the one or more answers provided by the pre-fill engine.

12. The method of claim 11, wherein the computing device is configured to access a seed dataset generator and a first database, and wherein determining the output document s from the seed dataset documents comprises:

receiving documents at the seed dataset generator from the first database; and determining the output documents from the documents received from the first database.

13. The method of claim 11, wherein the method further includes:

generating additional output questions by using the pre-fill engine, the pre-fill questions, and the data references.

14. The method of claim 11, wherein the method further comprises:

receiving answers to one or more associated pre-fill questions of the set of pre-fill questions through the graphical user interface.

15. The method of claim 11, wherein at least part of the output data and at least one of the electronic documents are displayed side by side on one screen in the graphical user interface for verification.

16. The method of claim 11, wherein the set of pre-fill questions are shown with corresponding answers on the graphical user interface.

17. The method of claim 11, wherein a score is displayed for an entity being evaluated, and wherein the score is determined based on the output data and answers to output questions.

18. A non-transitory computer-readable medium storing a set of instructions that, when executed by one or more processors of a computing device, cause the computing device to perform functions comprising:

receiving electronic documents, seed dataset documents, and pre-fill questions, wherein the electronic documents are a set of documents to be processed by a pre-fill engine of the computing device, wherein the seed dataset documents comprise a set of documents providing reference for the pre-fill engine, and wherein the pre-fill questions comprise a set of questions to be answered using the pre-fill engine;

determining output data from the electronic documents and data references to enable navigation through the electronic documents using a machine learning algorithm executed by the computing device, wherein the output data comprise data relevant to an insurance underwriting analysis, and wherein the data references rely upon terminology, categories, classifications and ontology of the insurance underwriting analysis;

determining output questions from the set of pre-fill questions and data references to enable navigation through the electronic documents using the machine learning algorithm, wherein the output questions are relevant to the insurance underwriting analysis;

determining output documents from the seed dataset documents and data references to enable navigation through the electronic documents using the machine learning algorithm, wherein the output documents are relevant to the insurance underwriting analysis;

presenting one or more answers for one or more of the output questions using a graphic al user interface; and training the pre-fill engine by utilizing a performance monitor to provide user feedback to the machine learning algorithm, wherein the user feedback includes user verification of the output data, the output documents, and/or the one or more answers provided by the pre-fill engine.

* * * * *